Oct. 28, 1958 P. C. GOLDMARK 2,858,374

PHONOGRAPH RECORD AND REPRODUCING APPARATUS

Filed Dec. 18, 1952

INVENTOR
Peter C. Goldmark
BY
Pennie, Edmonds, Morton, Barrows and Taylor
ATTORNEYS 2,858,374

PHONOGRAPH RECORD AND REPRODUCING APPARATUS

Peter C. Goldmark, New Canaan, Conn., assignor to Columbia Broadcasting System, Inc., New York, N. Y., a corporation of New York Application December 18, 1952, Serial No. 326,719

10 Claims. (Cl. 179—100.4)

This invention relates to phonograph records and to apparatus for the reproduction of sound therefrom and more particularly to phonograph records and reproducing equipment for the stereophonic reproduction of sounds.

In my copending application Serial No. 276,648, filed March 14, 1952, and which is assigned to the assignee hereof, I have disclosed and claimed a flat disk phonograph record bearing on its opposite faces two stereophonically related recordings of the same sounds. In the phonograph records of my said copending application, separate sound grooves are provided on the two sides of the disk record, pressed from separate master records cut at exactly the same angular speed so that in the sound grooves on opposite sides of those records at every angular distance from starting points at predeterimned bearings about the record disk axis the undulations are representative of sounds simultaneously perceived at spaced locations upon pickup. Preferably the reference bearings are the same on both sides of the record disk, and the sound groves are cut with the same pitch and initial radius so that stereophonically related undulations on the two faces of the disk are positioned everywhere at the same locations circumferentially of the disk and, moreover, at the same locations radially thereof except, in the case of laterally cut records, for the stereophonic differences in amplitude and phase which are intended to be preserved. Apart the modulation thereof therefore the two sound grooves constitute congruent spirals defined by the intersections with the faces of the disk of a cylindrical surface having one of the sound grooves as spiral directrix and having elements perpendicular to those faces.

For the successful playback of stereophonic records as disclosed in the said application, it is essential that the two styli of the reproducing equipment contact the two sound groves at stereophonically related undulations, i. e. at undulations representative of sounds simultaneously perceived at the spaced points of pickup upon recording. In playing back the preferred embodiment of the record of the said application above referred to therefore, the two playback styli of the reproducing apparatus should contact the record in a single plane containing the axis of rotation of the disk, so that the styli are disposed substantially "tip-to-tip." If instead the two recordings are rotationally staggered with respect to each other on the two sides of the record, the pick-up styli must be rotationally staggered by the same angle.

In practice accidental differences between reproducing styli and their mounting or in the circumferential positioning of the matrices from which the stereophonic records are pressed make it desirable to provide adjustment to the relative circumferential positioning of the reproducing styli. The present invention provides a record and a reproducing apparatus by which this adjustment may be quickly and accurately made to insure that the reproducing styli will engage the stereophonically related undulations in the two faces of the record.

According to the present invention, a stereophonic record is provided in each face of which there is formed a phasing groove distinct from that which carries the stereophonic version of the sound program recorded on that face. The phasing groove may take the form of a closed groove extending once around the record face, or it may constitute a spiral groove which is connected with the sound groove, or it may be a separate spiral groove from which the stylus must be lifted to the sound groove. Both phasing grooves are preferably modulated by a substantially pure tone of the same frequency. The frequency may be selected to give the desired accuracy of positioning. In some cases it may be advantageous to employ a frequency as high as the maximum frequency as to which it is important to preserve the relative phasings of the sounds simultaneously perceived at the spaced pick-up points during recording. The phasing grooves therefore follow substantially pure sine curves of the same wave length, and are positioned on the record in a known relative circumferential geometrical phase relationship with respect to each other and to the sound recordings on their respective faces.

In a preferred embodiment of the record of the present invention in which the sound grooves are related according to the preferred criterion above described, the phasing grooves are closed grooves of the same radius concentric of the record and are related geometrically by a phase difference of 180° of the pure tone modulation which they contain. They are moreover modulated to the same amplitude. When simultaneously engaged by two pick-up styli arranged "tip-to-tip," the two phasing grooves will generate in associated transducers electrical signals of the same frequency which will be 180° out of phase.

In accordance with another aspect of the invention these signals are employed to position correctly with respect to each other the pick-up styli of a reproducing phonograph apparatus for the playback of the records of the present invention, and are further employed to adjust the relative gains of the two amplifying channels which handle the two stereophonic recordings in order that a true stereophonic effect may be obtained.

The invention also provides a reproducing apparatus in which the relative circumferential positions of the two reproducing styli may be adjusted until a desired phase relation is observed between the electrical signals generated by the phasing grooves of the record of the invention.

The invention will now be described in conjunction with the accompanying drawings in which.

Figure 1:
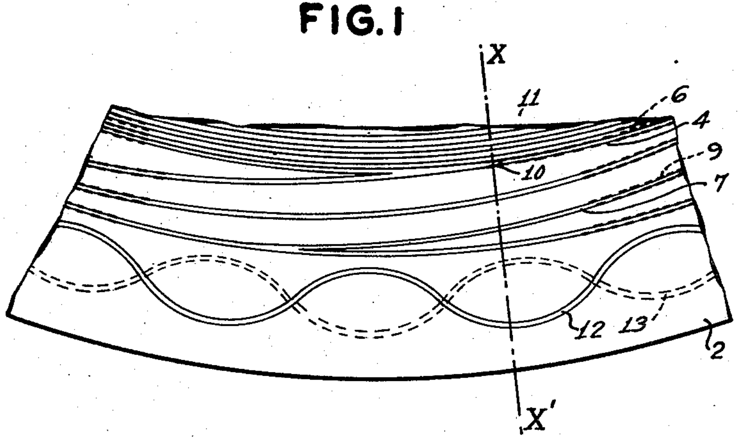
Fig. 1 is a fragmentary plan view of one form of record according to the invention.

The phonograph record of Fig. 1 comprises a flat disk 2 of a material such as a vinyl compound for example. It bears stereophonically related spiral sound grooves 4 and 6 on its two faces. The groove 6 on the face which is remote in the figure is indicated in dotted lines. The modulation of the sound grooves has been omitted for simplicity. On play back the reproducing styli are guided into the sound grooves 4 and 6 by means of lead-in grooves 7 and 9 of larger pitch. The sound grooves 4 and 6 are of the same initial radius and pitch and are in fact substantially congruent except for stereophonic differences between the sound modulations therein. The grooves 4 and 6 are moreover so oriented on the two faces of the record that their starting points 10 and 11 at which the lead-in grooves 7 and 9 join them lie on a common bearing or radius of the record indicated by the dashed line X—X'. The starting points 10 and 11 are points at the same radius from the center of the record and at the same bearing about the axis of the record. The essential attribute of points 10 and 11 is that they are points from which equal angular and linear departures along the record grooves 4 and 6 lead to stereophonically related undulations. Accordingly, reproducing styli which engage the two faces of the record at points lying in a plane containing the axis of rotation of the record and at substantially the same distance from that axis will generate in suitable transducers electrical signals whose variations in time will correspond to the variations in time of the acoustic pressures existing upon the recording at the two spaced points of pick-up. The record of Fig. 1 is therefore made for playback with styli arranged "tip-to-tip."

Radially outside the sound grooves 4 and 6 there are disposed two phasing grooves 12 and 13 concentric of the record disk and modulated with a single pure tone of the same frequency for both. In a preferred embodiment of the record of the invention shown in Fig. 1, the phasing grooves 12 and 13 are geometrically 180° out of phase with respect to each other so that pick-up styli engaging them will generate voltages 180° out of phase in time. The grooves 12 and 13 are preferably of zero pitch and consist each of a single turn of the same radius (apart the modulation therein) closed upon itself. Any discontinuity at the closures of the phasing grooves may be smoothed into a curve to insure that reproducing styli will be able to remain within those grooves throughout an unlimited number of revolutions of the record until manually or mechanically removed therefrom. In Fig. 1 the wave length and amplitude of the sinusoidal undulations in the phasing grooves has been greatly exaggerated.

The geometrical wave length of the modulation in the phasing grooves preferably corresponds, for the radius of those grooves and the intended angular speed of the record on play back, to a frequency in the middle audio range. Frequencies between about 90 C. P. S. and 360 C. P. S. may for example be used advantageously, although the invention is not limited thereto. The frequency may be selected at or near the maximum frequency for which it is important to preserve the stereophonic difference in phase existing at the spaced points of pick-up on recording. It may be observed that the mechanism of binaural hearing on which stereophonic sound reproduction depends is believed to involve primarily phase discrimination as to sounds of frequencies up to that for which the phase difference between the sound waves arriving at the hearer's two ears are some 180° out of phase. As to sounds of higher frequencies the hearer judges the direction of a sound source primarily by the difference in the intensity of the sounds reaching his two ears, because of the action of his head as a baffle. There is a considerable range of frequencies as to which both effects play a part.

The records of the invention may be manufactured according to the general method disclosed in my copending application above-identified. As there set forth, two master record disks are cut at the same angular speed by cutting styli which have the same initial distance from the centers of rotation of the master records and which are moved radially thereof at the same rate. The two cutting styli are actuated by transducers which receive electrical signals generated in separate microphones, spaced with respect to the source or sources whose sounds are to be recorded. The electrical channels between the microphones and cutting styli are matched as to phase shift and amplitude transfer characteristics. By means of mechanical indices on the master record disks equiangularly disposed to the cutting styli at the start of the cutting operation, or by the method employing phasing grooves in the master record to produce such indices after the cutting operation, as disclosed in the copending application of Daniel P. Doncaster, Serial No. 326,706, filed December 18, 1952, now Patent No. 2,772,888, and assigned to the assignee hereof, the negative plates from which the two-sided record of Fig. 1 is pressed can be oriented in the record press to position stereophonically related undulations in the sound grooves in single planes containing the disk axis in order to produce a record for play back by reproducing styli positioned "tip-to-tip."

Either before or after the cutting of the sound grooves, and without other than equal angular motions of the two master record disks with respect to the cutting styli, the phasing grooves corresponding to grooves 12 and 13 are cut into the master records, for example by supplying to the two cutting heads a sinusoidal electrical signal of a single frequency, and preferably of the same amplitude. For the embodiment of Fig. 1 a phase difference of 180° between the two phasing grooves is desired, and this can be achieved for example by reversing the leads to one of the cutting heads with respect to the position which those leads occupy during the cutting of the sound grooves.

With a phase difference in time of 180° in the oscillations of the cutting styli during the cutting of the phasing grooves in the master records, and with none but equal angular movements of the master records with respect to their cutting heads between the cutting of the sound and phasing grooves, the geometrical phase of the modulation in the phasing groove of one master record with respect to the sound groove starting point of that master record will be 180° different from the geometrical phase of the phasing groove modulation of the other master record with respect to the sound groove starting point of the other record. Accordingly in the resulting two-sided phonograph record of Fig. 1 in which the sound groove starting points are at the same bearing from the axis of the record disk, the two phasing grooves will be disposed 180° apart.

The record of the invention may be played back on a reproducing phonograph apparatus having separate tone arms and "pick-up" heads designed to engage both sides of the record at once at stereophonically related undulations in the two sound grooves. The signals generated in the two pick-up heads are amplified through separate channels matched as to phase shift and amplitude transfer characteristics and are passed to spaced loud-speakers. It is of course essential that the reproducing styli of the pick-up heads engage the sound grooves at stereophonically related undulations. To a first approximation this can be achieved by mounting the styli in similar pick-up heads arranged at the ends of two tone arms of the same length, rotatable about a single axis parallel to the axis of the turntable on which the record is rotated. The maintenance of the reproducing styli in a single plane containing the axis of rotation of the record as required for correct reproduction of the record of Fig. 1 is difficult to insure however in view of variation in the shape and length of the styli, among other things. The invention provides a reproducing phonograph apparatus suitable to the play back of the record of the invention, including means to insure that the reproducing styli engage stereophonically related undulations. One form of reproducing phonograph apparatus according to the invention is shown in Fig. 2.

Figure 2:
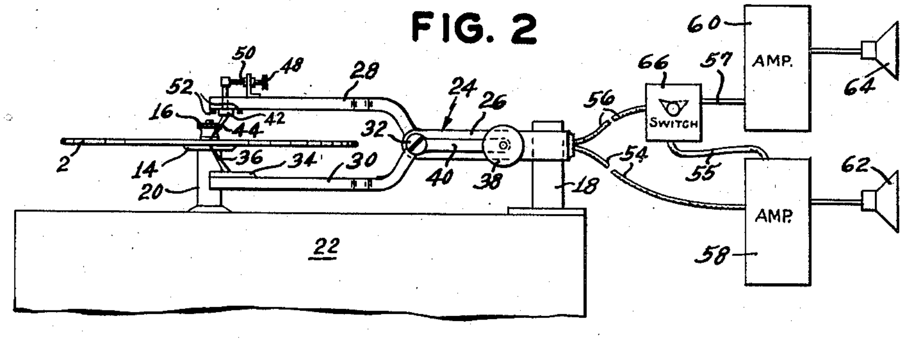
Fig. 2 is a fragmentary view in side elevation of one form of reproducing phonograph apparatus according to the invention for the playback of the stereophonic records of the invention and including, diagrammatically shown, separate loud-speakers and the elements necessary to adjustment of the apparatus to insure stereophonic sound reproduction.

In Fig. 2 the record 2 is shown supported on a turntable 14, to which it may be clamped by means of a nut 16. The turntable 14 is of small diameter compared to the record in order to permit simultaneous engagement of both of the sound grooves 4 and 6 on the opposite faces of the record. A vertical post 18 supported like the spindle 20 of the turntable from the reproducer chassis 22, carries a compound tone arm generally indicated at 24. The arm 24 includes a horizontal portion 26 pivoted for rotation on the post 18 and separate tone arms 28 and 30 journaled for rotation about a horizontal axis at 32. The tone arm 30 includes a play back transducer head or "cartridge" 34 from which projects a stylus 36 for engagement with the lower face of the record. Appropriate contact between the stylus 36 and the record is insured by means of a counterweight 38 attached to a lever 40 rigid with the tone arm 30. The upper tone arm 28 includes a similar transducer cartridge 42 having a stylus 44. The cartridge 42 rides on suitable rails provided in the arm 28 and is adjustable lengthwise of these rails through a small distance by a screw 48 threadedly engaging a nut 50 affixed to the arm 28. Stops 52 limit the excursion radially of the post 18 which can be made by the transducer 42 to a distance not exceeding the linear recorded wave length of the modulating signal in the phasing grooves 12 and 13 of the record.

Limitation of the motion of the transducer 42 relative to the transducer 34 to a distance less than the wave length on the record of the modulation signal in the phasing grooves precludes adjustment of the transducers to positions in which their styli are an integral number of such wave lengths apart. It is to be assumed that for the middle position of the transducer 42 between its stops the combined tolerances between the positions occupied by the ends of the styli 36 and 44 and the departure of the grooves 12 and 13 from the nominal phase difference of 180° will likewise be less than a wave length of the phasing groove modulation. Departure of the phasing grooves 12 and 13 from a nominal phase difference of 180° may result from small errors in the circumferential positioning of the negative plates in the record press during manufacture of the record. For a phasing groove modulation of five hundred cycles in grooves adjacent the periphery of a record 12 inches in diameter turning at 33⅓ revolutions per minute, this wave length is approximately 0.035 inch.

For stereophonic reproduction cables 54 and 56 carry the separate signals generated by the transducer cartridges 34 and 42 into separate amplifiers 58 and 60 which feed spaced loud-speakers 62 and 64. In order to insure however that the styli 36 and 44 engage stereophonically related undulations means are provided whereby the signals in the cables 54 and 56 can be combined in a single amplifier 58, as by applying both to the control grid of an amplifying vacuum tube (not shown) in that amplifier. For this purpose an appropriate audio frequency switch 66 is provided, inserted into cable 56. Switch 66 permits passage of the signal from the cable 56 to the amplifier 60 via cable 57 or, without changing the phase thereof, to amplifier 58 via cable 55. Thus the switch 66 and cables 54—57 are to be so proportioned that in-phase oscillations of the styli 36 and 44 will produce in-phase excitation of the amplifiers 58 and 60 when switch 66 connects cable 56 to cable 57, and so that such oscillations will produce in-phase signals at the separate inputs of cables 54 and 55 to amplifier 58 when switch 66 connects cable 56 to cable 55.

With the switch 66 closed to feed the signals from both reproducing styli to the amplifier 58, the adjusting screw 48 is moved until minimum sound is heard from the speaker 64. The minimum sound condition indicates that the styli engage the phasing grooves 12 and 13 at points which are 180° aparts as to the phasing signal there recorded. Since the phasing grooves are positioned 180° apart on the record faces, and since the ends of the styli are assumed to differ in their positions radially of the post 18 (i. e. tangentially of the record) by less than the wave length on the record of the phasing signal, the minimum sound condition indicates that the ends of the two styli lie in a single plane containing the axis of rotation of the record. They will therefore engage stereophonically related undulations in the two sound grooves. To the extent that the phasing grooves are not 180° apart in their geometrical phase relation, i. e. to the extent that the sound groove starting points 10 and 11 lie on different bearings, as long as the sum of the departure of the phasing grooves from a 180° relation and the separation of the two styli points for the mid position of the transducer 42 does not exceed the wave length of the phasing signal, the minimum sound condition indicates that both types of error are properly compensated and that although the styli will not lie in a single plane containing the record axis they will nevertheless engage stereophonically related undulations in the two sound grooves.

Figure 3:
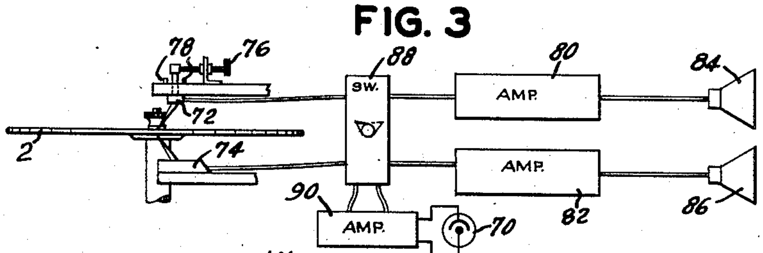
Fig. 3 is a diagrammatic view of a modified form of reproducing phonograph apparatus according to the invention.

Other means than a loud-speaker may be employed in the reproducing apparatus of the invention to compare the time phase of the signals generated in the reproducing styli in order to adjust the relative positions of those styli. Fig. 3 shows an alternative embodiment of the reproducing apparatus of the invention in which a neon tube 70 is employed to adjust the reproducing styli for proper relative position. In the embodiment of Fig. 3 transducers 72 and 74 engage the two faces of the record 2, transducer 72 being adjustable radially of its supporting pivot and hence substantially tangentially of the record grooves by means of a screw 76 through a limited range of motion defined by stops 78. For stereophonic reproduction the transducers 72 and 74 excite spaced loud-speakers 84 and 86 through matched amplifiers 80 and 82. For adjustment of the transducer styli a two-channel audio switch 88 is provided between the transducers and the amplifiers. In one of its two positions the switch 88 passes the signals from transducers 72 and 74 respectively to amplifiers 80 and 82 while in its second position it passes these signals to a third amplifier 90 where they are combined, either before or after amplification and applied to a neon tube 70. With the record of Fig. 1 the neon tube gives a visual indication of a minimum for the sum of the two transducer signals in place of the audible indication obtained in the embodiment of Fig. 2. As in the embodiment of Fig. 2 the audio switch and its connections to the amplifier 90 must be proportioned with due regard for the preservation of equal phase shift in the two channels leading from the transducers, in the one case to the amplifiers 80 and 82 and in the other case to the junction point of the two signals in the amplifier 90.

Figure 4:
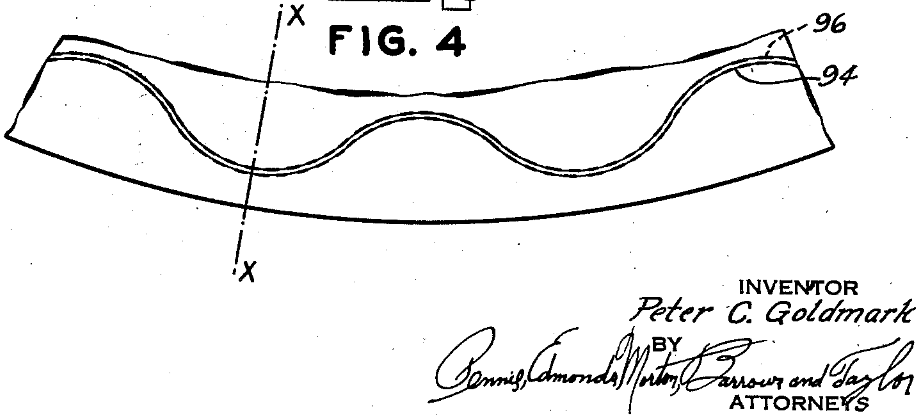
Fig. 4 is a view similar to that of Fig. 1 but showing a modified form of the record of the invention.

The phasing grooves of the record of the invention may have other relative phases than that shown in Fig. 1. Fig. 4 shows an alternative embodiment of the record of the invention in which the phasing grooves 94 (full lines) and 96 (dashed lines) are in-phase. In adjusting the reproducing apparatus of Fig. 2 to play back the record of Fig. 4, the screw 48 should be adjusted for maximum sound in the speaker 62. It is in fact only necessary that the two phasing grooves have the same frequency and that their relative phases be known. From such knowledge an appropriate amount of delay for the frequency of the phasing signal can be inserted in the channel leading from one of the pick-up styli to the point of junction of the two signals in amplifier 58 so that adjustment for either maximum or minimum response from the combined signals, according to the delay inserted, will indicate correct relative positioning of the two styli tangentially of the record.

According to the invention, the phasing grooves may be located either radially inside or radially outside of the sound grooves. Whether inside or outside of the sound grooves and whether closed (circular) or open (spiral) in form, they should, apart the modulation therein, be of the same radius at common bearings about the disk axis, i. e. they should be substantially congruent of each other and should be concentric of the disk.

Indeed the record of the invention comprises also embodiments in which the stereophonically related undulations on the two sides of the record lie in separate instead of common planes containing the record axis, as in the case of records in which there have occurred in manufacture relative displacements of the two recordings circumferentially of each other from the preferred condition for play back by "tip-to-tip" styli. So long as the phase relation of the phasing groove of each face to the sound groove starting point of that face is known, and so long as the circumferential displacement of the two sound groove starting points is known to the nearest cycle of the phasing groove modulation, the phasing grooves are usable for adjusting the position of the pickup styli tangentially of the record to positions which will result in their engagement of stereophonically related undulations.

In the preferred embodiments of the record of the invention shown in Figs. 1 and 4, the two phasing grooves are modulated by signals of the same amplitude. This provides a desirable sharp minimum or maximum to the sum of the two phasing signals, according as they are in opposite or in equal phases. With such equal amplitude modulations moreover the phasing grooves can be used to adjust the gains of the amplifiers 58 and 60 (in Fig. 2) or 80 and 82 (in Fig. 3) to equality. For stereophonic reproduction, equal amplitudes in phase in the undulations of the two sound grooves should give to the hearer the illusion of sound emanating from a region half-way between the speakers. With the record of Fig. 1 an in-phase excitation of the speakers 62 and 64 from the phasing groove signals may be achieved by reversing the leads to one of the speakers. With such a reversal, the gain of one or the other of the amplifiers 58 and 60 can be adjusted until the desired effect is observed by the hearer. If desired, additional gain controls in the two amplifiers can be ganged together for ready adjustment of the volume of reproduced sound.

While the invention has been described herein in terms of a number of preferred embodiments incorporating variout features of the invention, it is to be understood that the invention itself is not limited to these embodiments but is rather set forth in the appended claims. In particular, certain of the features of the invention hereinabove described can be employed separately in embodiments of the invention, or combined with others, as set forth in the appended claims.

I claim:

1. A phonograph record comprising a disk having two flat faces, said disk having concentric oppositely-directed spiral grooves in said two faces, said grooves containing undulations representative of stereophonically related sounds, said grooves being so dimensioned and positioned that undulations in said grooves lying within a plane containing the axis of the disk are stereophonically related, said disk further having two substantially congruent supplementary sound grooves, one disposed in each of said faces substantially concentric thereof, said supplementary grooves both containing undulations representative of the same cyclical signal having a dominant component of audio frequency, the undulations in said supplementary grooves being so positioned with respect to each other that the phase difference between the undulations in said two supplementary grooves at common bearings from the axis of the disk is a substantially integral multiple of one half the wave length of said dominant component as recorded in said supplementary grooves.

2. A phonograph record comprising a disk having two flat faces, said disk having concentric oppositely-directed spiral grooves in said two faces, said grooves containing undulations representative of stereophonically related sounds, said grooves being so dimensioned and positioned that undulations in said grooves lying within a plane containing the axis of the disk are stereophonically related, said disk further having two closed circular sound grooves of the same radius, one disposed in each of said faces concentric thereof, said circular grooves both containing undulations representative of a single substantially pure tone of audio frequency, the undulations in said circular grooves being so positioned with respect to each other that the angular difference measured at the axis of the disk between a first point in one of said circular grooves and the point in said same circular groove at the same bearing about the disk axis as the point in the other of said circular grooves nearest said first point having the same phase as said first point corresponds to a substantially integral number of halves of the wave length of said pure tone undulations.

3. A phonograph record comprising a disk having two flat faces, said disk having substantially congruent oppositely-directed concentric spiral grooves, one in each of said faces, said grooves lying at the intersections of said faces with a single cylindrical surface having one of said grooves as directrix, said grooves containing undulations which, at equal angular distances along said grooves from starting points therein lying on a line perpendicular to the face of said disk are representative of the same sounds as perceived at spaced points of pickup on recording, said disk having two substantially congruent supplementary grooves, one in each of its faces, said supplementary grooves containing undulations of substantially the same amplitude representative of a substantially pure tone in the range of middle audio frequencies, the phase difference between the undulations in said supplementary grooves at common bearings from the axis of the disk being a substantially integral multiple of one-half the wave length of said pure tone as recorded in said supplementary grooves.

4. A phonograph record comprising a disk having two flat faces, said disk having substantially congruent oppositely-directed spiral sound grooves formed in said faces lying substantially at the intersection of said faces with a single cylindrical surface having one of said grooves as directrix, said sound grooves having undulations therein adapted to effect stereophonic sound reproduction when played back by reproducing equipment having styli engaging said grooves at points lying substntially in a plane containing the axis of the disk, said disk having formed in said faces concentrically of said sound grooves two substantially congruent supplementary grooves containing undulations of substantially sinusoidal shape of the same wave length and amplitude, said wave length corresponding for the appropriate speed of rotation of said disk to a frequency in the middle range of audio frequencies, said sinusoidal undulations being so disposed that the phase difference there-between at common bearings about the disk axis is substantially equal to an integral multiple of said wave length.

5. A phonograph record comprising a disk having two flat faces, said disk having substantially congruent oppositely-directed spiral sound grooves formed in said faces and lying substantially at the intersection of said faces with a single cylindrical surface having one of said grooves as directrix, said sound grooves having undulations therein adapted to effect stereophonic sound reproduction when played back by reproducing equipment having styli engaging said grooves at points lying substantially in a plane containing the axis of the disk, two substantially congruent supplementary grooves, one in each of said faces, said supplementary grooves containing undulations of substantially sinusoidal shape of the same wave length and amplitude, said wave length corresponding for the appropriate speed of rotation of said disk to a frequency in the middle range of audio frequencies, said sinusoidal undulations being so disposed that the angular interval along said supplementary grooves as measured at the axis of the disk between a first point in one of said supplementary grooves and the nearest point in said same supplementary groove having the same phase as the point in the other of said supplementary groove on the same bearing as said first point is substantially equal to an integral number of multiples of one-half of said wave length.

6. A phonograph record comprising a disk having two flat faces, oppositely-directed spiral sound grooves bearing undulations impressed in its opposite faces, the undulations at equal angular distances along each of said sound grooves from bearings about the disk axis identified for each of said grooves and of known angular separation being respectively representative of sound vibrations simultaneously perceived at separate locations, said disk further having a supplementary groove on each of its faces, said supplementary grooves bearing undulations representative of a single cyclical signal, the undulations in one of said supplementary grooves having a known phase relation to the undulations in the other of said supplementary grooves.

7. In combination, a phonograph record of flat disk shape having impressed on its two faces substantially congruent spiral grooves lying on a cylindrical surface having one of said grooves as directrix, said grooves containing at points equidistant from starting points in said grooves at the intersections of said faces with a line perpendicular thereto undulations representative of sounds from one or more common sources simultaneously perceived at spaced points of pickup on recording, said modulations preserving up to a selected frequency in the middle audio range the differences in phase of the sounds so perceived, said record further having impressed on its faces substantially congruent supplementary grooves, one in each of its faces, bearing undulations representative of a single cyclical signal, the undulations in one of said supplementary grooves having a known phase relation to the undulations in the other of said supplementary grooves, and apparatus for reproducing sounds from said record, said apparatus comprising two spaced loudspeakers, a turntable, means to rotate the turntable at a speed appropriate to said record, two tone arms of substantially the same length rotatable about a common axis parallel to the axis of rotation of the turntable, electromechanical transducers arranged on said tone arms adapted each to engage the grooves in one of the faces of said record, first and second means respectively coupling signals from the transducers to said two loudspeakers, means for selectively coupling said signals to one of said loudspeakers, and means to adjust the position of one of said transducers substantially tangentially of said record through a distance not greater than the linear length of one of said undulations.

8. In combination, a phonograph record of flat disk shape having impressed on its two faces substantially congruent spiral grooves lying on a cylindrical surface having one of said grooves as directrix, said grooves containing at points equidistant from starting points in said grooves at the intersections of said faces with a line perpendicular thereto undulations representative of sounds from one or more common sources simultaneously perceived at spaced points of pickup on recording, said undulations preserving up to a selected frequency in the middle audio range the differences in phase of the sounds so perceived, said record further having impressed on its faces substantially congruent supplementary grooves, one in each of its faces, said supplementary grooves containing undulations of substantially sinusoidal shape of the same amplitude and of a length corresponding to the said selected frequency, said sinusoidal undulations being so positioned relatively to each other that the angular separation measured at the axis of the disk between points in said supplementary grooves of the same phase corresponds to a substantially integral multiple of a half wave length of said sinusoidal undulations, and apparatus for reproducing sounds from said record, said apparatus comprising two spaced loudspeakers a turntable, means to rotate the turntable at a speed appropriate to said record, two tone arms of substantially the same length rotatable about a common axis parallel to the axis of rotation of the turntable, electromechanical transducers arranged on said tone arms adapted each to engage the grooves in one of the faces of said record, first and second means respectively coupling signals from the transducers to said two loudspeakers, means for selectively coupling said signals to one of said loudspeakers, and means to adjust the position of one of said transducers substantially tangentially of said record through a distance not greater than the linear length of one of said sinusoidal undulations.

9. Apparatus for reproducing sound from a flat disk phonograph record having stereophonically related signal-modulated sound grooves therein positioned to generate stereophonically related signals upon play back by styli engaging said grooves at points lying substantially in a plane containing the axis of the record, said apparatus comprising a turntable, means to rotate the turntable at the speed appropriate to said record, two tone arms of substantially the same length rotatable about a common axis parallel to the axis of rotation of the turntable, an electromechanical transducer disposed on each of said arms, means to adjust the position of one of said transducers substantially tangentially of said record through a distance not greater than the linear length on said record of a cycle corresponding to the maximum frequency as to which stereophonic phase differences are to be preserved, and two spaced loud-speakers each coupled to one of said transducers.

10. A phonograph record comprising a disk having two flat faces, said disk having concentric oppositely-directed spiral grooves in said two faces, said grooves containing undulations representative of stereophonically related sounds, said grooves being so dimensioned and positioned that undulations in said grooves lying within a plane containing the axis of the disk are stereophonically related, said disk further having two substantially congruent supplementary sound grooves, one disposed in each of said faces substantially concentric thereof, said supplementary grooves both containing undulations representative of the same cyclical signal having a dominant component of audio frequency, the undulations in said supplementary grooves being so positioned with respect to each other that the angular difference measured at the axis of the disk between a first point in one of said supplementary grooves and the point in said same supplementary groove at the same bearing about the disk axis as the point in the other of said supplementary grooves nearest said first point having the same phase as said first point corresponds to a substantially integral number of halves of the wave length of said dominant component.

References Cited in the file of this patent

UNITED STATES PATENTS

| | | |
|---|---|---|
| 908,778 | Lamb | Jan. 5, 1909 |
| 939,781 | Wooster | Nov. 9, 1909 |
| 2,114,471 | Keller | Apr. 19, 1938 |
| 2,126,370 | Doolittle | Aug. 9, 1938 |
| 2,142,591 | Ross | Jan. 3, 1939 |
| 2,519,592 | Muller et al. | Aug. 22, 1950 |
| 2,600,573 | Rabkin | June 17, 1952 |
| 2,631,859 | Ellsworth | Mar. 17, 1953 |

FOREIGN PATENTS

| | | |
|---|---|---|
| 13,858 | Great Britain | June 15, 1907 |
| 457,479 | France | Sept. 18, 1913 |
| 558,207 | France | Aug. 23, 1923 |